J. W. CORN.
FILTER.
APPLICATION FILED JAN. 8, 1914.

1,119,575.

Patented Dec. 1, 1914.

Inventor
John W. Corn
By E. E. Vrooman
his Attorney

Witnesses

UNITED STATES PATENT OFFICE.

JOHN W. CORN, OF TYLER, TEXAS.

FILTER.

1,119,575.  Specification of Letters Patent.  Patented Dec. 1, 1914.

Application filed January 8, 1914. Serial No. 811,075.

*To all whom it may concern:*

Be it known that I, JOHN W. CORN, a citizen of the United States of America, residing at Tyler, in the county of Smith and State of Texas, have invented certain new and useful Improvements in Filters, of which the following is a specification, reference being had therein to the accompanying drawing.

This invention relates to filters and has for its principal object the production of a simple and efficient filter which is adapted to allow liquid or gas to freely pass therethrough and be cleansed of impurities and sediment.

Another object of this invention is the production of a filter having a plurality of retaining wires detachably secured thereto for retaining the filtering substance within the filter.

With these and other objects in view, this invention consists of certain novel combinations, constructions and arrangements of parts as will be hereinafter fully described and claimed.

Figure 1:
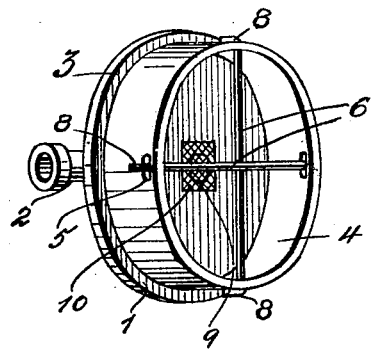
Figure 2:
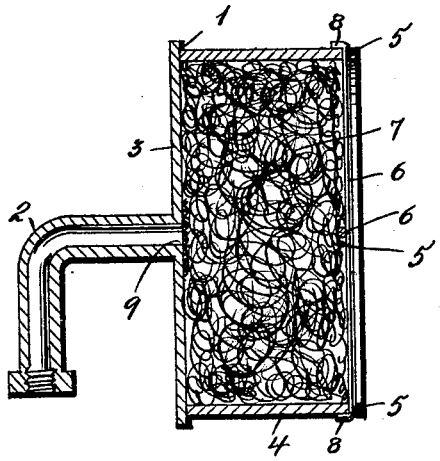

In the accompanying drawings:—Figure 1 is a detailed perspective view of the filter. Fig. 2 is a central section taken through the filter showing the filtering means carried thereby.

Referring to the accompanying drawing by numerals it will be seen that the filter 1 is provided with a supporting pipe 2, whereby the filter may be supported upon a suitable pipe or receptacle. This filter 1 comprises a box-like construction having a back 3 upon which the vertical side 4 is formed. This vertical side 4 is provided with the slots 5 through which the retaining wires 6 pass for retaining cotton or other filtering means 7 within the filter 1. These wires 6 are provided with angularly extending fingers 8 for holding the wires 6 in position within the front portion of this filter 1. These wires 6 are first positioned through the slots 5 at which time they are turned so as to allow the fingers 8 to extend at right-angles to the slots 5. After this has been accomplished, it will be seen that the wires will be efficiently held in position for retaining the cotton 7 within the filter 1. The back 3 is provided with an opening 9 communicating with the passage within the angular pipe 2 and this opening 9 is covered by a mesh 10 for preventing the cotton or other sediment from passing into the pipe 2.

It will be seen that by use of this filter, gas or liquid passing therethrough will be freed of refuse or sediment. When it is desired to cleanse the filter or replace the cotton or filtering material 7 with new material, the wires 6 may be turned so as to allow the fingers 8 to pass through the slots for allowing the wires to be removed. The filter may then be easily cleaned.

It will be seen that when the filter is in an assembled position gas or liquid will be allowed to pass freely therethrough since the forward portion thereof is entirely open.

What is claimed as new, is:

A filter for an acetylene gas comprising a back having sides extending therefrom at right angles thereto, an angularly extending pipe formed upon said back and communicating with the interior of the filter, said pipe being adapted to hold said filter in a vertical position, a filtering mesh positioned over the inner end of said pipe, said filter being adapted to carry a quantity of filtering substance, said sides provided with a plurality of oppositely disposed elongated slots, a plurality of wires passing across the forward open portion of said filter and extending through said slots, said wires provided with angularly bent fingers fitting upon the outer portion of said sides, said fingers being adapted to normally extend at right angles to said slots for retaining the wires in position whereby the filtering substances carried by the filter will be retained therein.

In testimony whereof I hereunto affix my signature in presence of two witnesses.

JOHN W. CORN.

Witnesses:
E. LINDSEY,
W. H. COUSINS.